W. G. COOMBS.
Plow.

No. 106,556.

Patented Aug. 23, 1870.

Witness.
Henry C. Houston.
Wm Franklin Leavey

Inventor
Wm G. Coombs
Per Wm H. Clifford atty.

UNITED STATES PATENT OFFICE.

WILLIAM G. COOMBS, OF NEW GLOUCESTER, MAINE.

IMPROVEMENT IN PLOWS.

Specification forming part of Letters Patent No. 106,556, dated August 23, 1870.

*To all whom it may concern:*

Be it known that I, WILLIAM G. COOMBS, of New Gloucester, in the county of Cumberland and State of Maine, have invented a new and useful Improvement in Plows; and I do hereby declare the following to be a full, clear, and exact description thereof, which will enable others to make and use my invention, reference being had to the accompanying drawings, forming part of this specification, in which—

Figure 1:
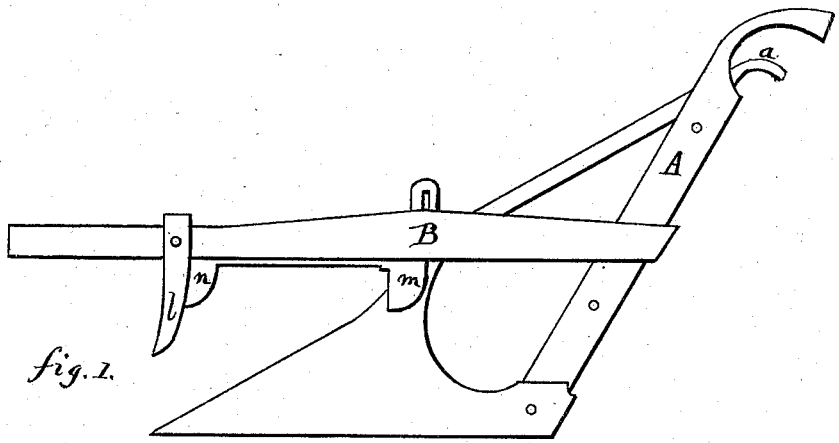
Figure 2:
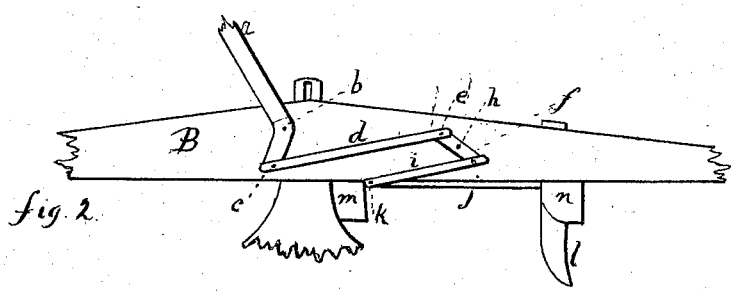
Figure 3:
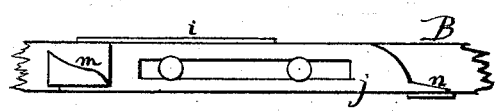

Figure 1 is a view of one side of a plow with my improvement thereon. Fig. 2 is a view of the other side of the beam with my improvement thereon. Fig. 3 is a view of the bottom side of the beam with my improvment attached thereto.

My invention has for its object to provide an attachment to conveniently disengage roots, sods, &c., that may adhere to the plow-iron and the knife while the plow is in use.

My device is attached to the beam of the plow, on one side thereof, by means of certain pivots, and has a hand-lever extending up between the handles of the plow, so as to be very easily operated by the hand used in holding the plow. $a$ shows this lever. It is pivoted to the plow-beam at $b$, where the lever is bent or curved slightly, and extends down even with the lower side of the beam, where there is pivoted at $c$ to this extension the connecting-arm $d$, which is pivoted at $e$ to the lever $f$, which is itself pivoted to the plow-beam at $h$. To the lower end of the lever $f$ is pivoted the arm $i$, which extends backward, and is pivoted to the slide $j$ at $k$. This slide $k$ is slotted, as seen in Fig. 3, and has two headed bolts confining the slide in place, and yet admitting of its moving backward and forward.

It will be seen by reference to the drawings that by pushing $a$ forward or toward the cattle drawing the plow, $j$ is also moved forward by the operation of the different levers and pivots above described. This slide $j$ is placed, as described, between the forward edge of the plowshare and the cutter or knife $l$. It is also provided with extra space enough to move backward and forward between the two.

Attached to the slide are the two cleaners, $m$ and $n$. These cleaners are on opposite sides of the share and colter, respectively, so as to serve as guides to the operation of the device; but both operate simultaneously when impelled by the arm $a$.

I am aware of the existence of other devices for this purpose; but such I do not claim, desiring to embrace only the combination herein set forth.

In the drawings, A A show the plow-handles, and B the beam.

What I claim as my invention, and desire to secure by Letters Patent, is—

The combination and arrangement of the lever $a$, pivot $b$, pivot $c$, arm $d$, pivot $e$, lever $f$, pivot $h$, arm $i$, pivot $k$, slotted slide $j$, with its confining-bolts in the slot, and cleaners $m$ $n$, arranged on opposite sides of the colter and share, respectively, applied as herein described.

WM. G. COOMBS.

Witnesses:
WM. H. CLIFFORD,
HENRY C. HOUSTON.